United States Patent
Sakawaki

(10) Patent No.: US 11,703,085 B2
(45) Date of Patent: Jul. 18, 2023

(54) ELECTRIC MOTOR SYSTEM, AND TURBO COMPRESSOR PROVIDED WITH SAME

(71) Applicant: DAIKIN INDUSTRIES, LTD., Osaka (JP)

(72) Inventor: Atsushi Sakawaki, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/955,411

(22) Filed: Sep. 28, 2022

(65) Prior Publication Data
US 2023/0018714 A1 Jan. 19, 2023

Related U.S. Application Data

(63) Continuation of application No. PCT/JP2021/010835, filed on Mar. 17, 2021.

(30) Foreign Application Priority Data

Mar. 30, 2020 (JP) ................................ 2020-060067
Sep. 29, 2020 (JP) ................................ 2020-163742

(51) Int. Cl.
*F16C 32/04* (2006.01)
*F04D 25/06* (2006.01)
(Continued)

(52) U.S. Cl.
CPC .......... *F16C 32/0406* (2013.01); *F04D 25/06* (2013.01); *F04D 29/058* (2013.01); *H02K 7/09* (2013.01)

(58) Field of Classification Search
CPC .... F16C 32/0406; F04D 25/06; F04D 29/058; H02K 7/09
(Continued)

(56) References Cited

U.S. PATENT DOCUMENTS

2014/0234139 A1 8/2014 Sakawaki et al.
2021/0010536 A1 1/2021 Yamasuso et al.

FOREIGN PATENT DOCUMENTS

CN 103827526 A 5/2014
DE 0364993 * 1/1996 .......... F16C 32/0444
(Continued)

OTHER PUBLICATIONS

International Search Report of corresponding PCT Application No. PCT/JP2021/010835 dated May 11, 2021.
(Continued)

*Primary Examiner* — Terrance L Kenerly
(74) *Attorney, Agent, or Firm* — Global IP Counselors, LLP

(57) ABSTRACT

An electric motor system includes a drive shaft, first and second magnetic bearing portions facing each other and supporting the drive shaft, an electric motor to rotate the drive shaft, and a gap detection unit to detect a position of the drive shaft During rotation of the drive shaft, greater external force acts, on average, on the drive shaft in a first direction than in a second direction. The first and second direction extend from the second and first magnetic bearing portions to the first and second magnetic bearing portion. The first and second magnetic bearing portions produce first and second magnetic forces on the drive shaft in the first and second directions. A magnitude of the second magnetic force is greater than a magnitude of the first magnetic force. The gap detection unit is arranged closer to the second magnetic bearing portion than to the first magnetic bearing portion.

26 Claims, 4 Drawing Sheets

(51) Int. Cl.
*F04D 29/058* (2006.01)
*H02K 7/09* (2006.01)

(58) Field of Classification Search
USPC .......................................................... 310/90.5
See application file for complete search history.

(56) References Cited

FOREIGN PATENT DOCUMENTS

| JP | 2001146917 | * | 5/2001 | ............. F16C 32/04 |
| JP | 2003314550 | * | 11/2003 | ............. F16C 32/04 |
| JP | 2013-50180 A | | 3/2013 | |
| JP | 2018-28296 A | | 2/2018 | |
| JP | 2019-173823 A | | 10/2019 | |

OTHER PUBLICATIONS

International Preliminary Report of corresponding PCT Application No. PCT/JP2021/010835 dated Oct. 13, 2022.

* cited by examiner

ELECTRIC MOTOR SYSTEM, AND TURBO COMPRESSOR PROVIDED WITH SAME

CROSS-REFERENCE TO RELATED APPLICATIONS

This is a continuation of International Application No. PCT/JP2021/010835 filed on Mar. 17, 2021, which claims priority to Japanese Patent Application Nos. 2020-060067, filed on Mar. 30, 2020 and 2020-163742, filed on Sep. 29, 2020. The entire disclosures of these applications are incorporated by reference herein.

BACKGROUND

Technical Field

The present disclosure relates to an electric motor system and a turbo compressor including the electric motor system.

Background Art

According to Japanese Unexamined Patent Publication No. 2019-173823, two thrust magnetic bearing portions are arranged next to each other in the axial direction of a drive shaft with an electric motor interposed therebetween.

SUMMARY

A first aspect of the present disclosure is directed to an electric motor system includes a drive shaft, a first magnetic bearing portion and a second magnetic bearing portion facing each other and supporting the drive shaft, an electric motor configured to rotate the drive shaft, and a gap detection unit configured to detect a position of the drive shaft. During rotation of the drive shaft, greater external force acts, on average, on the drive shaft in a first direction than in a second direction. The first direction extends from the second magnetic bearing portion to the first magnetic bearing portion, and the second direction extends from the first magnetic bearing portion to the second magnetic bearing portion. The first magnetic bearing portion produces a first magnetic force on the drive shaft in the first direction. The second magnetic bearing portion produces a second magnetic force on the drive shaft in the second direction. A magnitude of the second magnetic force that can be produced on the drive shaft by the second magnetic bearing portion is greater than a magnitude of the first magnetic force that can be produced on the drive shaft by the first magnetic bearing portion. The gap detection unit is arranged closer to the second magnetic bearing portion than to the first magnetic bearing portion.

DETAILED DESCRIPTION OF EMBODIMENT(S)

First Embodiment

A first embodiment of the present disclosure will be described. Note that the right side of FIG. 1 (the side closer to an impeller (30)) is referred to as the "front side", and the left side is referred to as the "rear side."

A turbo compressor (1) is used to a refrigeration apparatus such as an air conditioner. The refrigeration apparatus includes a refrigerant circuit in which refrigerant circulates. The turbo compressor (1) compresses refrigerant in the refrigerant circuit. Refrigerant circulates in the refrigerant circuit, thereby performing a vapor compression refrigeration cycle.

Configuration of Turbo Compressor

Figure 1:
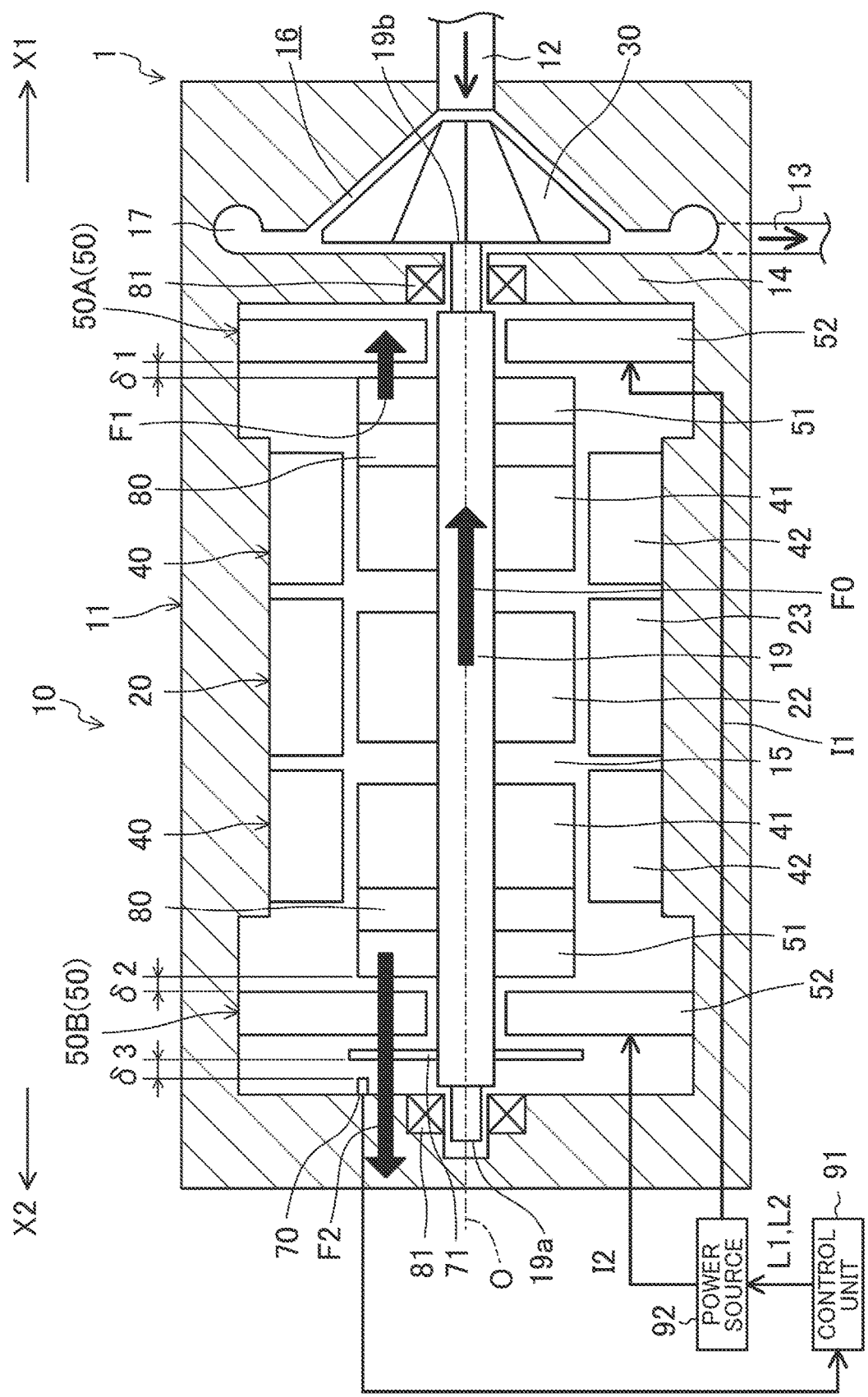
FIG. 1 is a view showing an example configuration of a turbo compressor of a first embodiment of the present disclosure.

FIG. 1 shows an example configuration of the turbo compressor (1) of this embodiment. The turbo compressor (1) includes an electric motor system (10), a casing (11), and the impeller (30).

The electric motor system (10) includes a drive shaft (19), an electric motor (20), radial magnetic bearings (40), thrust magnetic bearings (50), a gap detection unit (70), touchdown bearings (81), a control unit (91), and a power source (92).

The casing (11) is formed into a cylindrical shape with its both ends closed, and is arranged such that its axial direction extends horizontally. A space in the casing (11) is partitioned by a wall (14). A space on the rear side of the wall (14) is a driving mechanism space (15) for housing the drive shaft (19), the electric motor (20), the radial magnetic bearings (40), the thrust magnetic hearing (50), and the gap detection unit (70). A space on the front side of the wall (14) is an impeller space (16) for housing the impeller (30).

Drive Shaft

The drive shaft (19) is housed in the driving mechanism space (15) such that the axis (O) of the drive shaft (19) extends horizontally. In the following description, the term "axial direction" refers to the direction of the axis (O) of the drive shaft (19). Regarding the axial direction, the term "one side" refers to the rear side (the left side in FIG. 1). Regarding the axial direction, the term "the other side" refers to the front side (the right side in FIG. 1). The term "radial direction" refers to a direction perpendicular to the axial direction. The term "outer circumferential side" refers to a side farther from the axis (O) of the drive shaft (19). The term "inner circumferential side" refers to a side closer to the axis (O) of the drive shaft (19). The term "circumferential direction" refers to a circumferential direction with respect to the axis (O) of the drive shaft (19).

Electric Motor

The electric motor (20) includes a rotor (22) and a stator (23). The rotor (22) is fixed to the drive shaft (19) so as to rotate together with the drive shaft (19). The stator (23) is fixed to the inner peripheral surface of the casing (11). The outer peripheral surface of the rotor (22) and the inner peripheral surface of the stator (23) face each other with a predetermined distance therebetween. The electric motor (20) is, for example, a permanent magnet synchronous motor. The electric motor (20) rotates the drive shaft (19).

Impeller

The impeller (30) has a plurality of blades to have a substantially conical outer shape. The impeller (30) is provided on the drive shaft (19). Specifically, the impeller (30) is fixed to the other end portion (the front end portion) of the drive shaft (19) so as to rotate together with the drive shaft (19). The impeller (30) is housed in the impeller space (16). A suction pipe (12) and a discharge pipe (13) are connected to the impeller space (16). The impeller space (16) has an outer circumferential portion that forms a compression space (17). The suction pipe (12) is intended to introduce gas from the outside into the impeller space (16). The discharge pipe (13) is designed to return high-pressure gas compressed in the impeller space (16) to the outside.

Radial Magnetic Bearing

The electric motor system (10) includes two radial magnetic bearings (40, 40). The radial magnetic bearings (40, 40) produce, as electromagnets, electromagnetic force on the drive shaft (19) in the radial direction, thereby supporting the drive shaft (19) in a non-contact manner. Both radial magnetic bearings (40, 40) are arranged to be aligned in the axial direction of the drive shaft (19). Moreover, both radial magnetic bearings (40, 40) are arranged apart from each other with the electric motor (20) interposed therebetween. The radial magnetic bearing (40) includes a rotor (41) and a stator (42). The rotor (41) is fixed to the drive shaft (19) so as to rotate together with the drive shaft (19). The stator (42) is spaced apart from the rotor (41) with a predetermined distance. The stator (42) is fixed to the inner peripheral surface of the casing (11).

Thrust Magnetic Bearing

The electric motor system (10) includes the thrust magnetic bearing (50). The thrust magnetic bearing (50) includes a first thrust magnetic bearing portion (50A) and a second thrust magnetic bearing portion (50B). The first thrust magnetic bearing portion (50A) and the second thrust magnetic bearing portion (50B) face each other. The first thrust magnetic bearing portion (50A) and the second thrust magnetic bearing portion (50B) produce, as electromagnets, electromagnetic force (F1, F2) on the drive shaft (19) in the axial direction, thereby supporting the drive shaft (19) in a non-contact manner and controlling the axial position of the drive shaft (19) in a non-contact manner.

The first thrust magnetic bearing portion (50A) produces the electromagnetic force (F1) on the drive shaft (19) in a first direction (X1). The first direction (X1) is a direction from one end (the rear end) (19a) to the other end (the front end) (19b) of the drive shaft (19).

The second thrust magnetic hearing portion (50B) produces the electromagnetic three (F2) on the drive shaft (19) in a second direction (X2). The second direction (X2) is a direction from the other end (the front end) (19b) to one end (the rear end) (19a) of the drive shaft (19).

The first thrust magnetic bearing portion (50A) and the second thrust magnetic bearing portion (50B) are arranged to be aligned in the axial direction of the drive shaft (19). The first thrust magnetic bearing portion (50A) and the second thrust magnetic bearing portion (50B) are spaced from each other with the electric motor (20) interposed therebetween. In other words, the electric motor (20) is arranged between the first thrust magnetic bearing portion (50A) and the second thrust magnetic hearing portion (SOB).

The first thrust magnetic bearing portion (50A) is arranged on a side closer to the first direction (X1) (on the other side in the axial direction (the front side)) with respect to the electric motor (20). Specifically, the first thrust magnetic bearing portion (50A) is arranged between the impeller (30) and the front radial magnetic bearing (40) in the axial direction. In other words, the impeller (30) is arranged on a side closer to the first direction (X1) (the front side) with respect to the first thrust magnetic bearing portion (50A).

The second thrust magnetic bearing portion (50B) is arranged on a side closer to the second direction (X2) (one side in the axial direction (the rear side)) with respect to the electric motor (20). Specifically, the second thrust magnetic bearing portion (50B) is arranged on a side closer to the second direction (X2) (on the rear side) with respect to the rear radial magnetic bearing (40).

Each of the thrust magnetic bearing portions (50A, 50B) includes a rotor (51) and a stator (52). The rotor (51) is fixed to the drive shaft (19) so as to rotate together with the drive shaft (19). The stator (52) is spaced a predetermined distance apart from or (51). The stator (52) is fixed to the inner peripheral surface of the casing (11). The stator (52) is arranged outside the rotor (51) in the axial direction. Specifically, in the first thrust magnetic bearing portion (50A), the stator (52) is arranged on the first direction (X1) side (the front side) with respect to the rotor (51). In the second thrust magnetic hearing portion (50B), the stator (52) is arranged on the second direction (X2) side (the rear side) with respect to the rotor (51).

In FIG. 1, a reference character ((31) denotes a clearance (a gap) between the stator (52) and the rotor (51) in the first thrust magnetic bearing portion (50A) (hereinafter referred to as a "first gap length ($\delta 1$)"). A reference character ($\delta 2$) denotes a clearance (a gap) between the stator (52) and the rotor (51) in the second thrust magnetic bearing portion (50B) (hereinafter referred to as a "second gap length ($\delta 2$)").

Figure 2:
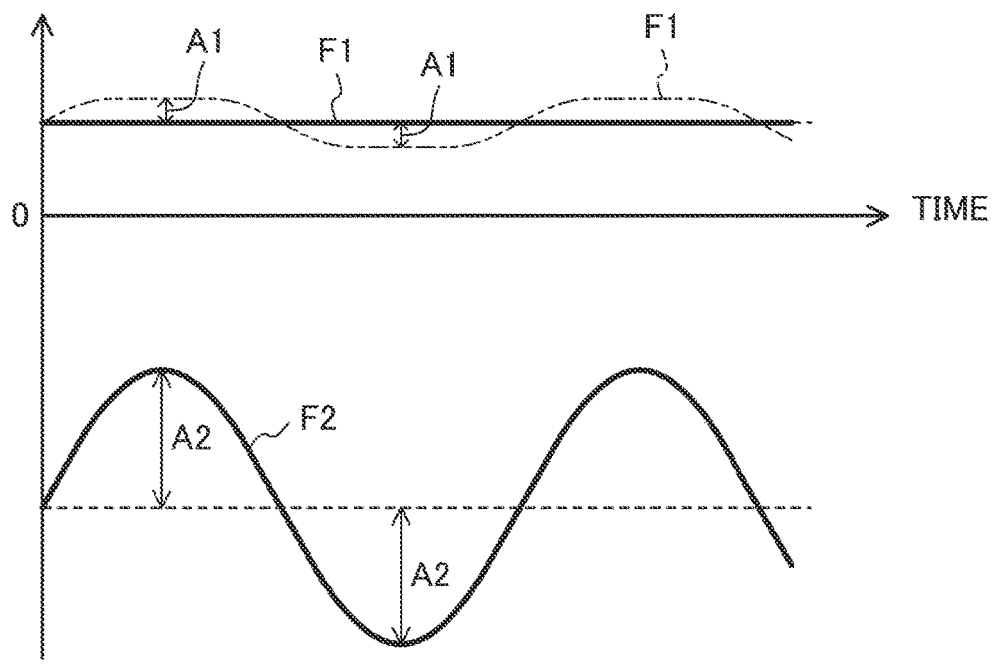
FIG. 2 is a graph showing a change in electromagnetic force (F1) of a first thrust magnetic bearing portion (50A) and electromagnetic force (F2) of a second thrust magnetic bearing portion (50B) over time.

FIG. 2 shows a change in the electromagnetic force (F1) of the first thrust magnetic bearing portion (50A) and the electromagnetic force (F2) of the second thrust magnetic bearing portion (50B) over time. As illustrated in FIG. 2, the magnitude of the electromagnetic force (F2) that can be produced on the drive shaft (19) by the second thrust magnetic bearing portion (50B) is greater than the magnitude of the electromagnetic force (F1) that can be produced on the drive shaft (19) by the first thrust magnetic bearing portion (50A). The magnitude of the electromagnetic force (F1, F2) is evaluated by, for example, the maximum or average value of the electromagnetic force (F1, F2).

Gap Detection Unit

The gap detection unit (70) is arranged on the second direction (X2) side (the rear side) with respect to the electric motor (20). Specifically, the gap detection unit (70) is arranged on a side closer to the second direction (X2) (the rear side) with respect to the second thrust magnetic hearing portion (50B). In other words, the gap detection unit (70) is arranged on a side closer to the second thrust magnetic bearing portion (50B) with respect to the first thrust magnetic bearing portion (50A). The gap detection unit (70) is fixed to an inner wall portion of the casing (11). The gap detection unit (70) is, for example, a gap sensor.

A target (71) is arranged on a side closer to the second direction (X2) (the rear side) with respect to the second thrust magnetic bearing portion (50B). The target (71) is fixed to the drive shaft (19) so as to rotate together with the drive shaft (19). The gap detection unit (70) detects a clearance between the gap detection unit (70) and the target (71) (hereinafter referred to as a "third gap length ($\delta 3$)"), thereby detecting the axial position of the drive shaft (19).

Control Unit

The control unit (91) controls the position of the drive shaft (19). Specifically, the control unit (91) controls the electromagnetic force of both radial magnetic bearings (40, 40), thereby controlling the radial position of the drive shaft (19), The control unit (91) controls the electromagnetic force (F1, F2) of the thrust magnetic bearing (50), more specifically the first thrust magnetic bearing portion (50A) and the second thrust magnetic bearing portion (SOB), thereby controlling the axial position of the drive shaft (19). The control unit (91) includes, for example, a microcomputer (not shown) and a program. The program operates the microcomputer. A detailed configuration of the control unit (91) will be described later.

Power Source

The power source (92) supplies electric power (current) to each of the radial magnetic bearings (40) and the thrust magnetic bearing (50) based on a command signal from the control unit (91). For example, the power source (92) is configured as a pulse width modulation (PWM) amplifier.

Others

The reference character (80) in FIG. 1 denotes a non-magnetic ring. The non-magnetic ring (80) is arranged between the rotor (41) of the radial magnetic bearing (40) and the rotor (51) of the thrust magnetic bearing (50). The reference character (81) in FIG. 1 denotes a touchdown bearing. Each touchdown bearing (81) is intended to prevent contact between the stator (42) and the rotor (41) of the radial magnetic bearing (40) and contact between the stator (52) and the rotor (51) of the thrust magnetic bearing (50).

Operation of Turbo Compressor

The operation of the turbo compressor (1) will be described below. Electric power supplied to the electric motor (20) allows the rotor (22) of the electric motor (20) to rotate. Thus, the drive shaft (19) and the impeller (30) rotate. Rotation of the impeller (30) allows gas to be sucked through the suction pipe (12) into the impeller space (16) and to be compressed. The compressed high-pressure gas is discharged to the outside from the impeller space (16) through the discharge pipe (13).

During the operation of the turbo compressor (1), i.e., rotation of the drive shaft (19), greater external force (F0) acts, on average, on the drive shaft (19) in the first direction (X1) than in the second direction (X2) particularly in the maximum load state. During rotation of the drive shaft (19), the drive shaft (19) tends to move in the first direction (X1).

There is no problem if greater external force temporarily acts on the drive shaft (19) in the second direction (X2) than in the first direction (X1).

During rotation of the drive shaft (19), the external force acting on the drive shaft (19) is mainly the resultant three of the fluid three of refrigerant and the three of gravity. During rotation of the drive shaft (19), the fluid force mainly acts on the impeller (30) side (the front side) in the axial direction and in the radial direction. In this embodiment, the drive shaft (19) is arranged to extend horizontally, and therefore, the external force acting on the drive shaft (19) in the axial direction during rotation of the drive shaft (19) is substantially coincident with the fluid force acting on the impeller (30) side (the front side).

The term "maximum load state" means a state when the magnitude of fluid force acting on the drive shaft (19) is the maximum. The term "maximum load state" does not necessarily mean a state when the number of rotations of the drive shaft (19) is the maximum.

Correlation Among Gap Lengths

As the drive shaft (19) moves in the first direction (X1), the third gap length (63) and the second gap length ($\delta 2$) increase. As the drive shaft (19) moves in the first direction (X1), the first gap length ($\delta 1$) decreases. As the drive shaft (19) moves in the second direction (X2), the third gap length ($\delta 3$) and the second gap length ($\delta 2$) decrease. As the drive shaft (19) moves in the second direction (X2), the first gap length ($\delta 1$) increases.

In an ideal state, the sum of the gap length ($\delta 1$) of the first thrust magnetic bearing portion (50A) and the gap length ($\delta 2$) of the second thrust magnetic bearing portion (50B) does not fluctuate. In other words, the fluctuation amount of the gap length ($\delta 1$) of the first thrust magnetic bearing portion (50A) and the fluctuation amount of the gap length ($\delta 2$) of the second thrust magnetic bearing portion (50B) are identical to each other. Thus, in the ideal state, if the gap length ($\delta 1$, $\delta 2$) of one of the thrust magnetic bearing portions (50A, 50B) is controlled, the gap length ($\delta 1$, $\delta 2$) of the other thrust magnetic bearing portion (50A, 50B) is inevitably controlled.

However, depending on temperature conditions, operation conditions, etc., the sum of the gap length ($\delta 1$) of the first thrust magnetic bearing portion (50A) and the gap length ($\delta 2$) of the second thrust magnetic bearing portion (50B) may fluctuate. In other words, the fluctuation amount of the gap length ($\delta 1$) of the first thrust magnetic bearing portion (50A) and the fluctuation amount of the gap length ($\delta 2$) of the second thrust magnetic bearing portion (50B) may be different from each other. In this case, even if the gap length ($\delta 1$, $\delta 2$) of one of the thrust magnetic beating portions (50A, 50B) is controlled, the gap length ($\delta 1$, $\delta 2$) of the other thrust magnetic bearing portion (50A, 50B) is not controlled.

Examples of the indication of the fluctuation amount include a difference between a target value and a maximum/minimum value, a difference between a median value and a maximum/minimum value, a difference between an average value and a maximum/minimum value, and a difference between a minimum value and a maximum value. Specific examples of the cause of the difference between both gap lengths ($\delta 1$, $\delta 2$) include thermal expansion due to a temperature change and a surging phenomenon.

Focusing on the situation where during rotation of the drive shaft (19) of the turbo compressor (1), greater external force (F0) acts, on average, on the drive shaft (19) in the first direction (X1) than in the second direction (X2), the axial position of the drive shaft (19) is, in this embodiment, controlled in such a manner that the electromagnetic three (F2) of the second thrust magnetic bearing portion (50B) is exclusively controlled. Specifically, the fluctuation amount of the second gap length (δ2) of the second thrust magnetic bearing portion (50B) is set smaller than the fluctuation amount of the first gap length (δ1) of the first thrust magnetic bearing portion (50A).

In order to decrease the fluctuation amount of the second gap length (δ2), the electromagnetic force (F2) of the second thrust magnetic bearing portion (50B) needs to be accurately controlled. In this embodiment, the gap detection unit (70) is arranged on a side closer to the second thrust magnetic bearing portion (50B) with respect to the first thrust magnetic bearing portion (50A), and in this manner, the difference between the fluctuation amount of the third gap length (δ3) and the fluctuation amount of the second gap length (δ2) is decreased as much as possible. Thus, when the second gap length (δ2) of the second thrust magnetic bearing portion (50B) is controlled, the third gap length (δ3) of the gap detection unit (70) can be substantially directly used without using a correction factor, an estimation rule, etc. relating to thermal expansion.

Figure 3:
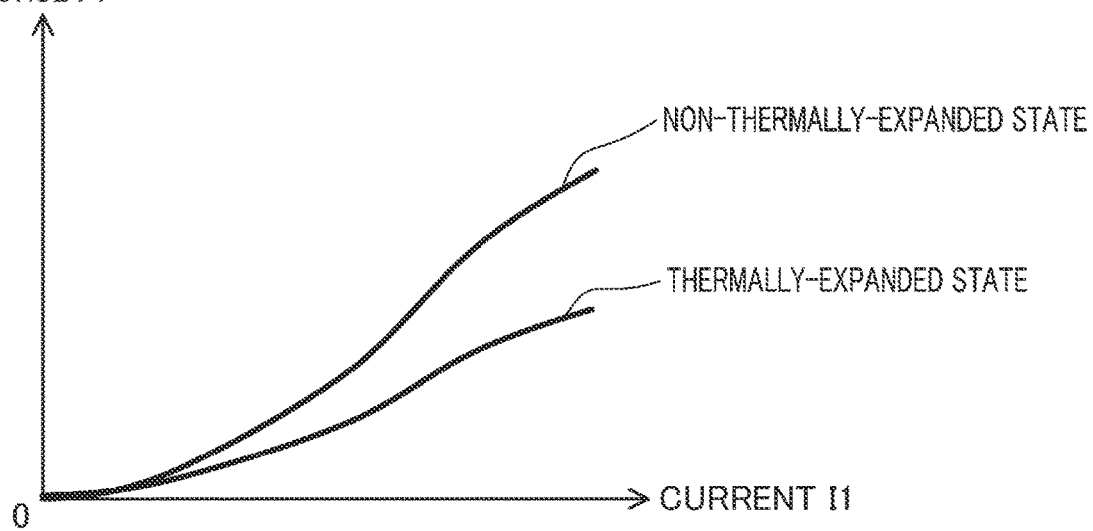
FIG. 3 is a graph showing a relationship between an electromagnetic force (F1) and a current value (I1) in the first thrust magnetic bearing portion (50A).

As described below, it is difficult to accurately control the electromagnetic force (F1) of the first thrust magnetic bearing portion (50A). FIG. 3 shows a relationship between an output electromagnetic force (F1) and an input current value (I1) in the first thrust magnetic bearing portion (50A). As shown in FIG. 3, the magnitude of the output electromagnetic force (F1) in a thermally-expanded state and the magnitude of the output electromagnetic force (F1) in a non-thermally-expanded state are different from each other. This is because of the following reasons: the electromagnetic force (F1) can be expressed by a function using the first gap length (δ1) as a parameter, and therefore, when the first gap length (δ1) fluctuates due to thermal expansion, even if the input current value (I1) is the same, the magnitude of the output electromagnetic force (F1) fluctuates. That is, in order to accurately control the electromagnetic force (F1) of the first thrust magnetic bearing portion (50A), it is necessary to accurately detect the first gap length (δ1).

However, since the first thrust magnetic bearing portion (50A) is apart from the gap detection unit (70), it is likely to cause the difference between the fluctuation amount of the third gap length (δ3) and the fluctuation amount of the first gap length (δ1). Thus, although the first gap length (δ1) is an important parameter for determining the magnitude of the electromagnetic force (F1), it is difficult to directly detect the first gap length (δ1) from the third gap length (δ3).

Control Mode for Thrust Magnetic Bearing

The control unit (91) controls the electromagnetic force (F1) of the first thrust magnetic bearing portion (50A) and the electromagnetic force (F2) of the second thrust magnetic bearing portion (50B). Specifically, as shown in FIGS. 1 and 2, the control unit (91) inputs a command signal (L1) to the power source (92). The power source (92) supplies current (I1) to the first thrust magnetic bearing portion (50A) based on the command signal (L1). The control unit (91) inputs a command signal (L2) to the power source (92). The power source (92) supplies current (I2) to the second thrust magnetic bearing portion (50B) based on the command signal (L2).

The control unit (91) controls the electromagnetic force (F1) of the first thrust magnetic bearing portion (50A) and the electromagnetic force (F2) of the second thrust magnetic bearing portion (50B) such that the fluctuation amount of the second gap length (δ2) of the second thrust magnetic bearing portion (50B) is smaller than the fluctuation amount of the first gap length (δ1) of the first thrust magnetic bearing portion (50A). The control unit (91) may control only the electromagnetic force (F2) of the second thrust magnetic bearing portion (50B) without controlling the electromagnetic force (F1) of the first thrust magnetic bearing portion (50A). In other words, the control unit (91) may control at least the electromagnetic force (F2) of the second thrust magnetic bearing portion (S0B).

As illustrated in FIG. 2, the control unit (91) controls, at an optional timing, the amplitude (A2) of the electromagnetic force (F2) of the second thrust magnetic bearing portion (50B) to be greater than the amplitude (A1) of the electromagnetic force (F1) of the first thrust magnetic bearing portion (50A). In other words, the amplitude (A2) of the electromagnetic force (F2) of the second thrust magnetic bearing portion (50B) is a variable that can be changed at an optional timing.

According to the third gap length (δ3) of the gap detection unit (70), the control unit (91) controls the electromagnetic force (F2) of the second thrust magnetic bearing portion (50B) such that the drive shaft (19) is at a predetermined axial position.

The control unit (91) controls the electromagnetic force (F2) of the second thrust magnetic bearing portion (50B) in such a manner that the magnitude of the current (I2) to be supplied to the second thrust magnetic bearing portion (50B) is adjusted according to the third gap length (δ3) of the gap detection unit (70).

As shown in FIG. 2, the control unit (91) controls the electromagnetic force (F1) of the first thrust magnetic bearing portion (50A) such that a certain level of electromagnetic force (F1) acts on the drive shaft (19). The certain level of electromagnetic force (F1) may be a constant (see a solid line in FIG. 2) greater than zero. The certain level of electromagnetic force (F1) may be zero. The certain level of electromagnetic force (F1) may be represented by a sine wave (see a chain double-dashed line in FIG. 2) having a certain amplitude (A1). In this case, the amplitude (A1) of the electromagnetic force (F1) of the first thrust magnetic bearing portion (50A) is constant regardless of time.

During the operation of the turbo compressor (1) (rotation of the drive shaft (19)), greater external force (F0) acts on the drive shaft (19) in the first direction (X1) than in the second direction (X2). Thus, it is less necessary to cause the electromagnetic force (F1) in the first direction (X1) to act on the drive shaft (19) by the first thrust magnetic bearing portion (50A).

For this reason, the control unit (91) controls the magnitude of the electromagnetic force (F1) of the first thrust magnetic bearing portion (50A) during rotation of the drive shaft (19) to be smaller than the magnitude of the electromagnetic force (F1) of the first thrust magnetic bearing portion (50A) during non-rotation of the drive shaft (19).

Figure 4:
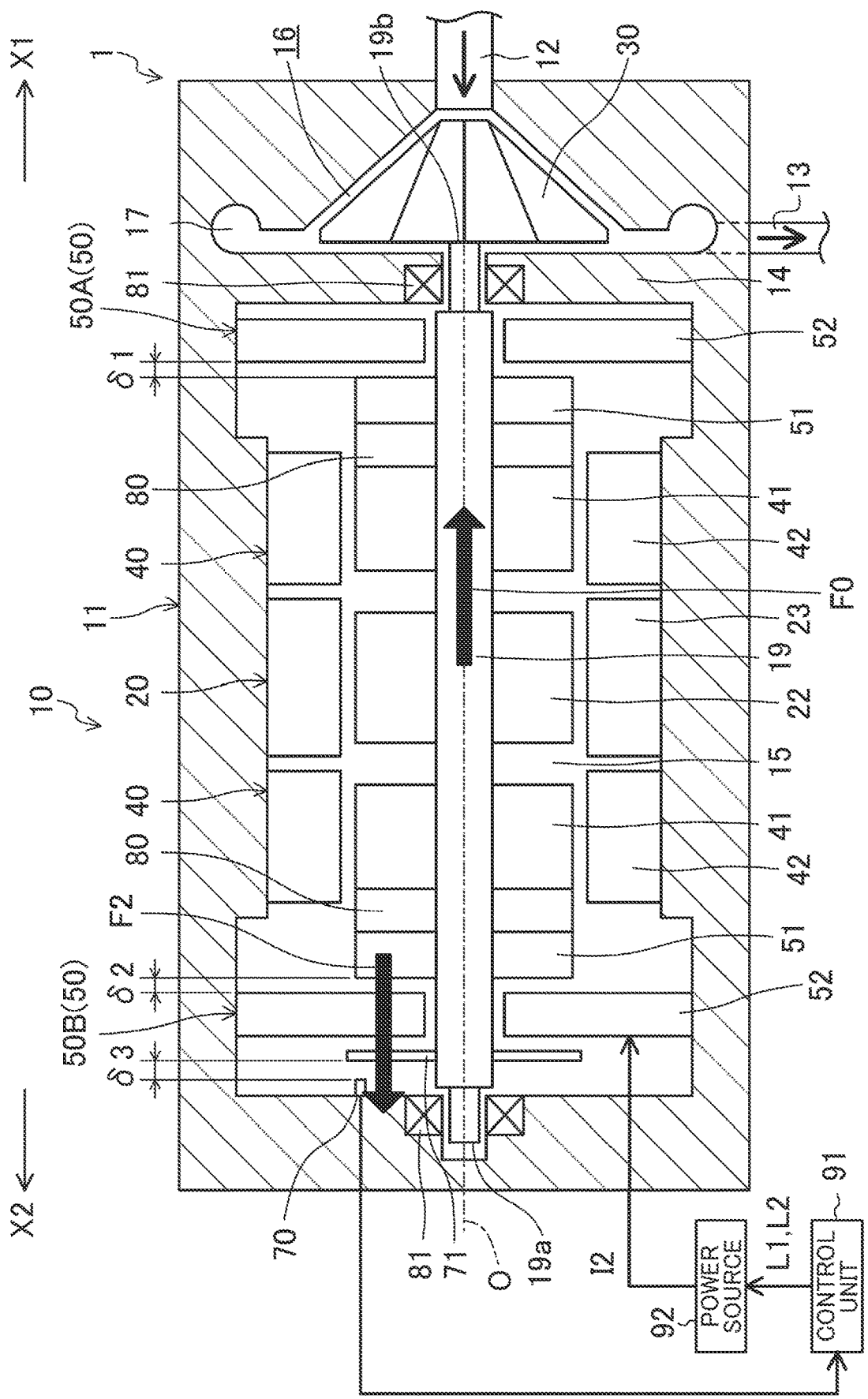
FIG. 4 is a view in a case where the magnitude of the electromagnetic force (F1) of the first thrust magnetic bearing portion (50A) is set to zero, FIG. 4 corresponding to FIG. 1.

As illustrated in FIG. 4, the control unit (91) may set the magnitude of the electromagnetic force (F1) of the first thrust magnetic hearing portion (50A) to zero during rotation of the drive shaft (19). Examples of the method for setting the magnitude of the electromagnetic force (F1) to zero include a method in which no current (I1) is supplied to the first thrust magnetic hearing portion (50A) (see FIG. 4).

Advantages of First Embodiment

The electric motor system (10) can be provided, which can control the axial position of the drive shaft (19) even in a case where the two thrust magnetic hearing portions (50A, 50B) are spaced from each other.

The third gap length (δ3) of the gap detection unit (70) can be set as close as possible to the second gap length (δ2) of the second thrust magnetic bearing portion (50B). Thus, for adjusting the second gap length (δ2) of the second thrust magnetic bearing portion (50B) having a small fluctuation amount and requiring fine adjustment, the third gap length (δ3) of the gap detection unit (70) can be substantially directly used without using the correction factor, the estimation rule, etc. in addition, it is not necessary to prepare a plurality of gap detection units (70), and therefore, a control system can be simplified.

The second gap length (δ2) of the second thrust magnetic bearing portion (50B) can be finely adjusted.

Even if the electromagnetic force (F1) of the first thrust magnetic bearing portion (50A) is not controlled, the fluctuation amount of the second gap length (δ2) of the second thrust magnetic bearing portion (50B) can be decreased by control of the electromagnetic force (F2) of the second thrust magnetic bearing portion (50B).

The drive shaft (19) that tends to move in the first direction (X1) with the external force (F0) can be moved in the second direction (X2) at an optional timing by the second thrust magnetic bearing portion (50B). Thus, even if the electromagnetic force (F1) of the first thrust magnetic bearing portion (50A) is not controlled, the axial position of the drive shaft (19) can be finely adjusted by the second thrust magnetic bearing portion (50B). In addition, the amplitude (A2) of the electromagnetic force (F2) of the second thrust magnetic bearing portion (50B) is greatly changed (greatly vibrated) as compared to the amplitude (A1) of the electromagnetic force (F1) of the first thrust magnetic bearing portion (50A), and in this manner, influence of thermal expansion can be reduced and degradation of control performance can be reduced or prevented.

Even if the electromagnetic force (F1) of the first thrust magnetic bearing portion (50A) is not controlled, the drive shaft (19) can be at a predetermined axial position by the second thrust magnetic bearing portion (50B).

Even if the magnitude of the current (I1) to be supplied to the first thrust magnetic bearing portion (50A) is not adjusted, the axial position of the drive shaft (19) can be controlled.

The electromagnetic force (F1) of the first thrust magnetic bearing portion (50A) is set constant regardless of the third gap length (δ3) of the gap detection unit (70), and in this manner, only the second thrust magnetic bearing portion (50B) can be set as a control target according to the third gap length (δ3) of the gap detection unit (70).

Since the drive shaft (19) tends to move in the first direction (X1) during rotation of the drive shaft (19), the electromagnetic force (F1) of the first thrust magnetic bearing portion (50A) in the first direction (X1) may be small. In this embodiment, the useless electromagnetic force (F1) acting on the drive shaft (19) by the first thrust magnetic bearing portion (50A) during rotation of the drive shaft (19) can be reduced as much as possible.

The magnitude of the electromagnetic force (F1) of the first thrust magnetic bearing portion (50A) is set to zero, and in this manner, the useless electromagnetic force (F1) acting on the drive shaft (19) by the first thrust magnetic bearing portion (50A) can be eliminated.

The turbo compressor (1) can be provided, which can control the axial position of the drive shaft (19) even in a case where the two thrust magnetic hearing portions (50A, 50B) are spaced from each other.

If the gap detection unit (70) and the impeller (30) are on the same side in the axial direction with respect to the electric motor (20), the drive shaft (19) is increased in length by a space where the gap detection unit (70) is provided. In this case, a floating body (a rotary body including the drive shaft (19)) is increased in length, leading to a lower resonant frequency. Such a lower resonant frequency may have an adverse effect on magnetic levitation control. In this embodiment, the gap detection unit (70) and the impeller (30) are spaced from each other in the axial direction with the electric motor (20) interposed therebetween, and therefore, an increase in the length of the floating body can be suppressed. Thus, the adverse effect on the magnetic levitation control can be reduced.

First Variation of First Embodiment

Figure 5:
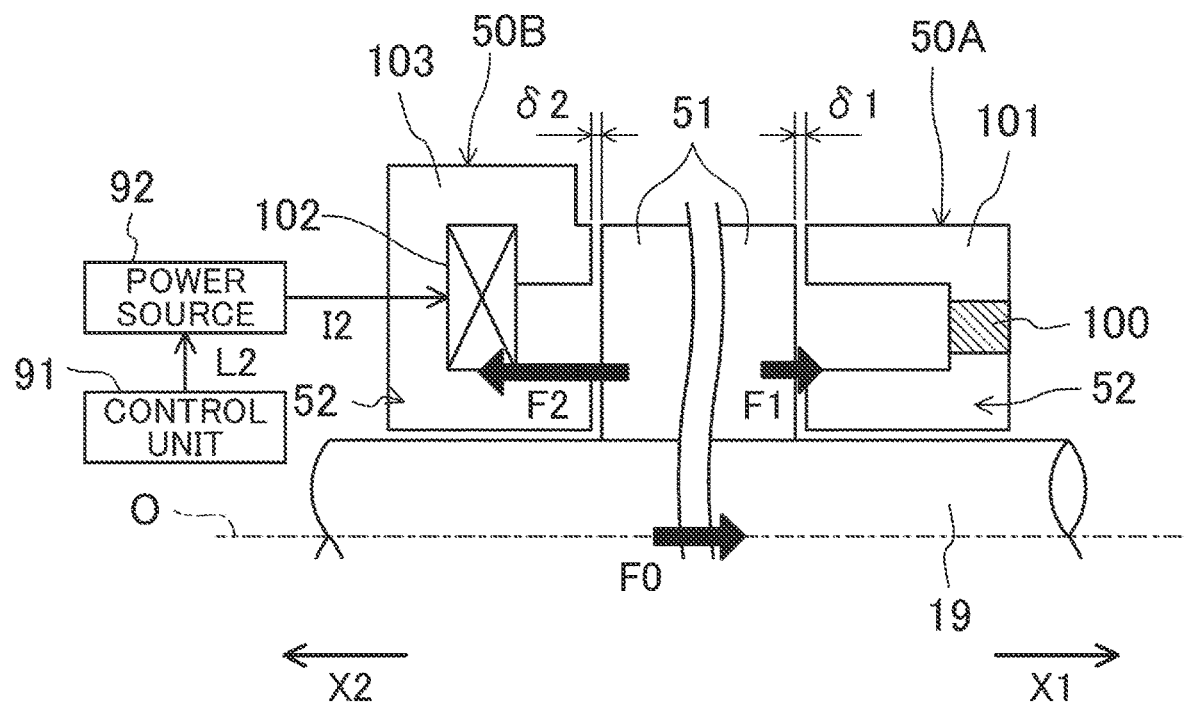
FIG. 5 is a view showing the configuration of a thrust magnetic bearing (50) in a first variation of the first embodiment.

FIG. 5 shows the configuration of the thrust magnetic bearing (50) in a first variation of the first embodiment. In this variation, the first thrust magnetic bearing portion (50A) has no coil, and causes the magnetic force (F1) to act on the drive shaft (19) only by a permanent magnet (100). The permanent magnet (100) is supported by a support portion (101).

Also in this case, the second thrust magnetic hearing portion (50B) produces, as an electromagnet, the electromagnetic force (F2) on the drive shaft (19). The second thrust magnetic bearing portion (50B) has a coil (102). The coil (102) is wound around a magnetic material (103) such as an iron core. The control unit (91) inputs the command signal (L2) to the power source (92). The power source (92) supplies the current (I2) to the coil (102) of the second thrust magnetic bearing portion (50B) based on the command signal (L2). The control unit (91) does not control the magnetic force (F1) of the first thrust magnetic bearing portion (50A).

Although not shown, the second thrust magnetic bearing portion (50B) may further include a permanent magnet (100) in addition to the coil (102).

Advantages of First Variation of First Embodiment

The configuration of the first thrust magnetic hearing portion (50A) can be simplified.

Second Variation of First Embodiment

In this variation, although not shown, the first thrust magnetic hearing portion (50A) causes the magnetic force (F1) to act on the drive shaft (19) not based on any of the first gap length (δ1) of the first thrust magnetic bearing portion (50A), the second gap length (δ2) of the second thrust magnetic bearing portion (50B), and the third gap length (δ3) of the gap detection unit (70).

Examples of the method for producing the magnetic force (F1) include a method in which the control unit (91) controls the first thrust magnetic bearing portion (50A) not based on the gap lengths (δ1, δ2, δ3) such that the magnetic force (F1) acts and a method in which the control unit (91) is not used and the coil (102) of the first thrust magnetic bearing portion (50A) is directly connected to a direct current bus (a DC bus) to apply a certain level of voltage.

Examples of the magnitude of the magnetic force (F1) include a constant greater than zero, zero, a sine wave having a constant amplitude, and a variable of a predetermined algorithm.

Advantages of Second Variation of First Embodiment

The values of the gap lengths ($\delta 1$, $\delta 2$, $\delta 3$) do not need to be fed back to the first thrust magnetic bearing portion (50A), and therefore, control of the magnetic force (F1) by the first thrust magnetic bearing portion (50A) is facilitated.

Other Variations of First Embodiment

In this embodiment, in each thrust magnetic bearing portion (50A, 50B), the rotor (51) is arranged inside in the axial direction, and the stator (52) is arranged outside in the axial direction. However, the present disclosure is not limited to above. For example, in the thrust magnetic bearing portion (50A, 50B), the rotor (51) may be arranged outside in the axial direction, and the stator (52) may be arranged inside in the axial direction. In this case, the first thrust magnetic bearing portion (50A) is arranged on the second direction (X2) side (the rear side) with respect to the electric motor (20), and causes the magnetic force (F1) to act in the first direction (X1). The second thrust magnetic bearing portion (50B) is arranged on the first direction (X1) side (the front side) with respect to the electric motor (20), and causes the magnetic force (F2) to act in the second direction (X2).

In this embodiment, the drive shaft (19) is arranged so as to extend horizontally, but the present disclosure is not limited to above. For example, the drive shaft (19) may be arranged so as to extend vertically with the impeller (30) side thereof positioned on the upper side in the vertical direction. In this case, the external force acting on the drive shaft (19) in the axial direction during rotation of the drive shaft (19) is the resultant force of the fluid force acting on the impeller (30) side (the upper side in the vertical direction) and the force of gravity acting on the opposite side (the lower side in the vertical direction) of the impeller (30) side. Thus, great external force (F0) may act, on average, on the drive shaft (19) not on the impeller (30) side (the upper side in the vertical direction) but on the opposite side (the lower side in the vertical direction) of the impeller (30) side.

Second Embodiment

Figure 6:
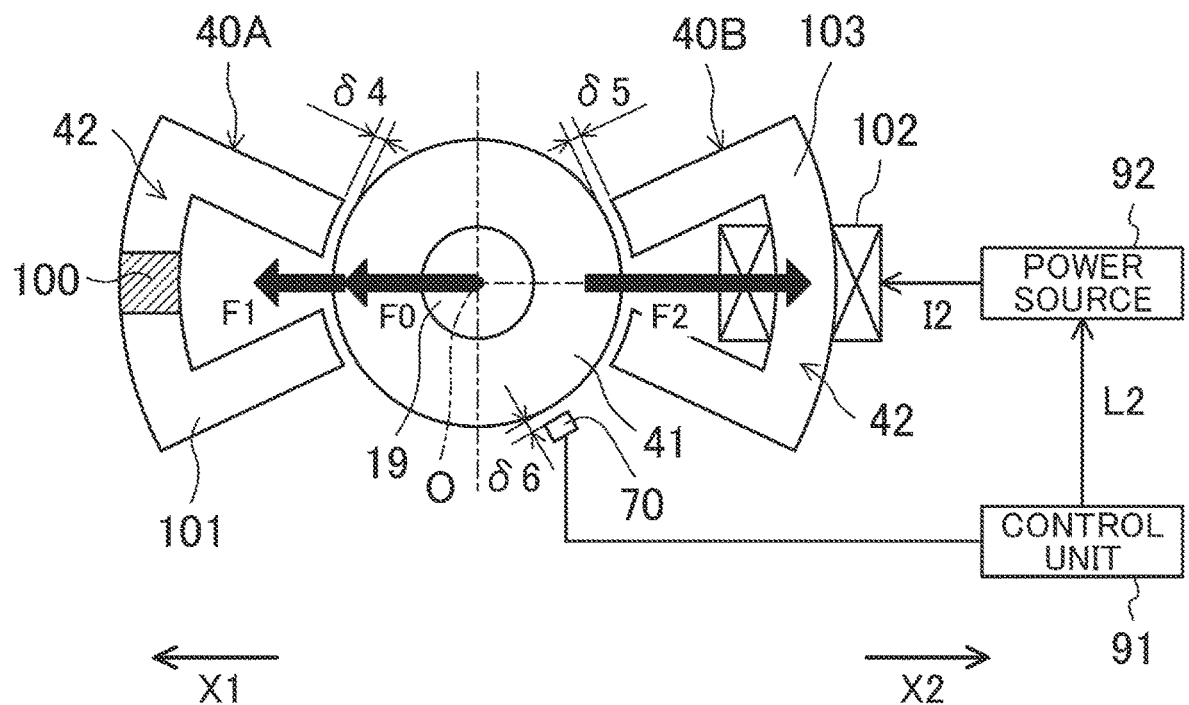
FIG. 6 is a view showing a configuration of a radial magnetic bearing (40) in a second embodiment.

FIG. 6 shows a configuration of a radial magnetic bearing (40) in a second embodiment. In this embodiment, at least one of the radial magnetic bearings (40) includes a first radial magnetic bearing portion (40A) and a second radial magnetic bearing portion (40B).

The first radial magnetic bearing portion (40A) and the second radial magnetic bearing portion (40B) are arranged to be aligned in the radial direction of a drive shaft (19) so as to face each other. The first radial magnetic bearing portion (40A) and the second radial magnetic bearing portion (40B) produce magnetic force (F1, F2) on the drive shaft (19) in the radial direction, thereby supporting the drive shaft (19) in a non-contact manner and controlling the radial position of the drive shaft (19) in a non-contact manner.

During rotation of the drive shaft (19), greater external force (F0) acts, on average, on the drive shaft (19) in a first direction (X1) that extends from a second radial magnetic bearing portion (40B) to a first radial magnetic bearing portion (40A) than in a second direction (X2) that extends from the first radial magnetic bearing portion (40A) to the second radial magnetic bearing portion (40B).

The first radial magnetic bearing portion (40A) produces the magnetic force (F1) on the drive shaft (19) in the first direction (X1). The second radial magnetic bearing portion (40B) produces the magnetic force (F2) on the drive shaft (19) in the second direction (X2). The magnitude of the magnetic force (F2) that can be produced on the drive shaft (19) by the second radial magnetic bearing portion (40B) is greater than the magnitude of the magnetic force (F1) that can be produced on the drive shaft (19) by the first radial magnetic bearing portion (40A).

A gap detection unit (70) detects the radial position of the drive shaft (19). The gap detection unit (70) is arranged closer to the second radial magnetic bearing portion (40B) than to the first radial magnetic bearing portion (40A).

In FIG. 6, a reference character ($\delta 4$) denotes a gap length ($\delta 4$) between a stator (42) and a rotor (41) in the first radial magnetic bearing portion (40A). In FIG. 6, a reference character ($\delta 5$) denotes a gap length ($\delta 5$) between a stator (42) and a rotor (41) in the second radial magnetic bearing portion (40B). A reference character ($\delta 6$) denotes a gap length ($\delta 6$) between the gap detection unit (70) and the rotor (41). Note that the gap length ($\delta 6$) may be a clearance between the gap detection unit (70) and a target (not shown) fixed to a floating body (a rotary body including the drive shaft (19)) so as to rotate together with the floating body.

An electric motor system (10) may be configured such that the fluctuation amount of the gap length ($\delta 5$) of the second radial magnetic bearing portion (40B) is smaller than the fluctuation amount of the gap length ($\delta 4$) of the first radial magnetic bearing portion (40A) in a case where the fluctuation amount of the gap length ($\delta 4$) of the first radial magnetic bearing portion (40A) and the fluctuation amount of the gap length ($\delta 5$) of the second radial magnetic bearing portion (40B) are different from each other.

The electric motor system (10) may further include a control unit (91) that controls at least the magnetic force (F2) of the second radial magnetic bearing portion (40B) such that the fluctuation amount of the gap length ($\delta 5$) of the second radial magnetic bearing portion (40B) is smaller than the fluctuation amount of the gap length ($\delta 4$) of the first radial magnetic bearing portion (40A).

The control unit (91) may control, at an optional timing, the amplitude (A2) of the magnetic force (F2) of the second radial magnetic bearing portion (40B) to be greater than the amplitude (A1) of the magnetic force (F1) of the first radial magnetic bearing portion (40A).

According to the gap length ($\delta 6$) of the gap detection unit (70), the control unit (91) may control the magnetic force (F2) of the second radial magnetic bearing portion (40B) such that the drive shaft (19) is at a predetermined radial position.

The control unit (91) may control the magnetic force (F2) of the second radial magnetic bearing portion (40B) in such a manner that the magnitude of current (I2) to be supplied to the second radial magnetic bearing portion (40B) is adjusted according to the gap length ($\delta 6$) of the gap detection unit (70).

The control unit (91) may control the magnetic force (F1) of the first radial magnetic bearing portion (40A) such that a certain level of magnetic force (F1) acts on the drive shaft (19).

The control unit (91) may control the magnitude of the magnetic force (F1) of the first radial magnetic bearing portion (40A) during rotation of the drive shaft (19) to be smaller than the magnitude of the magnetic force (F1) of the first radial magnetic bearing portion (40A) during non-rotation of the drive shaft (19).

The control unit (91) may set the magnitude of the magnetic force (F1) of the first radial magnetic bearing portion (40A) to zero during rotation of the drive shaft (19).

As shown in FIG. 6, the first radial magnetic bearing portion (40A) may have no coil, and may cause the magnetic force (F1) to act on the drive shaft (19) only by a permanent magnet (100). Although not shown, the first radial magnetic bearing portion (40A) may cause, as an electromagnet having a coil, electromagnetic force (F1) to act on the drive shaft (19).

The first radial magnetic bearing portion (40A) may cause the magnetic force (F1) to act on the drive shaft (19) not based on any of the gap length ($\delta 4$) of the first radial magnetic bearing portion (40A), the gap length ($\delta 5$) of the second radial magnetic bearing portion (40B), and the gap length ($\delta 6$) of the gap detection unit (70).

During rotation of the drive shaft (19), the external three acting on the drive shaft (19) in the radial direction is the resultant force of fluid force and the force of gravity acting on the drive shaft (19). In a preferred embodiment, according to the first direction (X1) in which greater external force (F0) acts, on average, on the drive shaft (19), the first radial magnetic bearing portion (40A) is arranged on a first direction (X1) side and the second radial magnetic bearing portion (40B) is arranged on a second direction (X2) side, i.e., the opposite side of the first direction (X1) side, as necessary.

For example, in a case where the drive shaft (19) is arranged so as to extend horizontally, the force of gravity is more dominant than the fluid force in the external force acting on the drive shaft (19) in the radial direction in many cases. In this case, the first direction (X1) in which greater external force (F0) acts, on average, on the drive shaft (19) is the downward direction in the vertical direction. Thus, in this case, the first radial magnetic bearing portion (40A) is arranged on the lower side in the vertical direction with respect to the drive shaft (19) and the second radial magnetic bearing portion (40B) is arranged on the upper side in the vertical direction with respect to the drive shaft (19), in a preferred embodiment.

In this embodiment, the first radial magnetic bearing portion (40A) and the second radial magnetic bearing portion (40B) are arranged one by one (two portions in total) at an interval of 180°, but the present disclosure is not limited to above. For example, first radial magnetic bearing portions (40A) and second radial magnetic bearing portions (40B) may be arranged two by two (four portions in total) at an interval of 90°.

Other configurations of the first radial magnetic bearing portion (40A) and the second radial magnetic bearing portion (40B) are similar to those in the case of the first thrust magnetic bearing portion (50A) and the second thrust magnetic bearing portion (SOB), and therefore, detailed description thereof will be omitted.

Advantages of Second Embodiment

The electric motor system (10) can be provided, which can suitably control the radial position of the drive shaft (19) by the pair of radial magnetic bearing portions (40A, 40B) facing each other with the floating body (the rotary body including the drive shaft (19)) interposed therebetween in the radial direction.

In control of the radial position of the drive shaft (19) by the radial magnetic bearing portions (40A, 40B), advantages similar to those in the case of control of the axial position of the drive shaft (19) by the thrust magnetic bearing portions (50A, 50B) can be obtained.

Other Embodiments

The electric motor system (10) may be applied to other rotary machines such as a pump, for example.

While the embodiment and variations thereof have been described above, it will be understood that various changes in form and details may be made without departing from the spirit and scope of the claims. The embodiments and the variations thereof may be combined and replaced with each other without deteriorating intended functions of the present disclosure.

The invention claimed is:

1. An electric motor system comprising:
a drive shaft;
a first magnetic bearing portion and a second magnetic bearing portion facing each other and supporting the drive shaft;
an electric motor configured to rotate the drive shaft; and
a gap detection unit configured to detect a position of the drive shaft,
during rotation of the drive shaft, greater external force acting, on average, on the drive shaft in a first direction than in a second direction,
the first direction extending from the second magnetic bearing portion to the first magnetic bearing portion, and
the second direction extending from the first magnetic bearing portion to the second magnetic bearing portion,
the first magnetic bearing portion producing a first magnetic force on the drive shaft in the first direction,
the second magnetic bearing portion producing a second magnetic force on the drive shaft, in the second direction,
a magnitude of the second magnetic force that can be produced on the drive shaft by the second magnetic bearing portion being greater than a magnitude of the first magnetic force that can be produced on the drive shaft by the first magnetic bearing portion, and
the gap detection unit being arranged closer to the second magnetic bearing portion than to the first magnetic bearing portion.

2. The electric motor system of claim 1, wherein
the first magnetic bearing portion and the second magnetic bearing portion are a first thrust magnetic bearing portion and a second thrust magnetic bearing portion, respectively, arranged to be aligned in an axial direction of the drive shaft,
the electric motor is arranged between the first thrust magnetic bearing portion and the second thrust magnetic bearing portion,
the gap detection unit is configured to detect an axial position of the drive shaft,
the first direction extends from one end to an other end of the drive shaft, and
the second direction extends from the other end to the one end of the drive shaft.

3. The electric motor system of claim 2, wherein
in a case in which a fluctuation amount of a first gap length of the first thrust magnetic bearing portion and a fluctuation amount of a second gap length of the second thrust magnetic bearing portion are different from each other, the fluctuation amount of the second gap length of the second thrust magnetic bearing portion is smaller than the fluctuation amount of the first gap length of the first thrust magnetic bearing portion.

4. The electric motor system of claim 3, further comprising:
a control unit is configured to control at least the second magnetic force of the second thrust magnetic bearing portion such that the fluctuation amount of the second gap length of the second thrust magnetic bearing portion is smaller than the fluctuation amount of the first gap length of the first thrust magnetic bearing portion.

5. The electric motor system of claim 4, wherein
the control unit is configured to control, at an optional timing, an amplitude of the second magnetic force of the second thrust magnetic bearing portion to be greater than an amplitude of the first magnetic force of the first thrust magnetic bearing portion.

6. The electric motor system of claim 4, wherein
according to a third gap length of the gap detection unit, the control unit is configured to control the second magnetic force of the second thrust magnetic bearing portion such that the drive shaft is at a predetermined axial position.

7. The electric motor system of claim 4, wherein
the control unit is configured to control the second magnetic force of the second thrust magnetic bearing portion such that a magnitude of current to be supplied to the second thrust magnetic bearing portion is adjusted according to the third gap length of the gap detection unit.

8. The electric motor system of claim 6, wherein
the control unit is configured to control the first magnetic force of the first thrust magnetic bearing portion such that a predetermined level of first magnetic force acts on the drive shaft.

9. The electric motor system of claim 4, wherein
the control unit is configured to control a magnitude of the first magnetic force of the first thrust magnetic bearing portion during rotation of the drive shaft to be smaller than a magnitude of the first magnetic force of the first thrust magnetic bearing portion during non-rotation of the drive shaft.

10. The electric motor system of claim 9, wherein
the control unit is configured to set the magnitude of the first magnetic force of the first thrust magnetic bearing portion to zero during rotation of the drive shaft.

11. The electric motor system of claim 2, wherein
the first thrust magnetic bearing portion causes the first magnetic force to act on drive shaft only by a permanent magnet.

12. The electric motor system of claim 2, wherein
the first thrust magnetic bearing portion causes the first magnetic force to act on the drive shaft not based on any of the first gap length of the first thrust magnetic bearing portion, the second gap length of the second thrust magnetic bearing portion, and the third gap length of the gap detection unit.

13. A turbo compressor including the electric motor system of claim 2, the turbo compressor further comprising:
an impeller provided on the drive shaft.

14. The turbo compressor of claim 13, wherein
the first thrust magnetic bearing portion is arranged on a first direction side with respect to the electric motor,
the second thrust magnetic bearing portion is arranged on a second direction side with respect to the electric motor,
the gap detection unit is arranged on the second direction side with respect to the electric motor, and
the impeller is arranged on the first direction side with respect to the first thrust magnetic bearing portion.

15. The electric motor system of claim 1, wherein
the first magnetic bearing portion and the second magnetic bearing portion are a first radial magnetic bearing portion and a second radial magnetic bearing portion, respectively, arranged to be aligned in a radial direction of the drive shaft, and
the gap detection unit is configured to detect a radial position of the drive shaft.

16. The electric motor system of claim 15, wherein
in a case in which a fluctuation amount of a gap length of the first radial magnetic bearing portion and a fluctuation amount of a gap length of the second radial magnetic bearing portion are different from each other, the fluctuation amount of the gap length of the second radial magnetic bearing portion is smaller than the fluctuation amount of the gap length of the first radial magnetic bearing portion.

17. The electric motor system of claim 16, further comprising:
a control unit configured to control at least the second magnetic force of the second radial magnetic bearing portion such that the fluctuation amount of the gap length of the second radial magnetic bearing portion is smaller than the fluctuation amount of the gap length of the first radial magnetic bearing portion.

18. The electric motor system of claim 17, wherein
the control unit is configured to control, at an optional timing, an amplitude of the second magnetic force of the second radial magnetic bearing portion to be greater than an amplitude of first magnetic force of the first radial magnetic bearing portion.

19. The electric motor system of claim 17, wherein
according to a gap length of the gap detection unit, the control unit is configured to control the second magnetic force of the second radial magnetic bearing portion such that the drive shaft is at a predetermined radial position.

20. The electric motor system of claim 17, wherein
the control unit is configured to control the second magnetic force of the second radial magnetic bearing portion such that a magnitude of current to be supplied to the second radial magnetic bearing portion is adjusted according to the gap length of the gap detection unit.

21. The electric motor system of claim 19, wherein
the control unit configured to control the first magnetic force of the first radial magnetic hearing portion such that a predetermined level of first magnetic force acts on the drive shaft.

22. The electric motor system of claim 17, wherein
the control unit configured to control a magnitude of the first magnetic force of the first radial magnetic bearing portion during rotation of the drive shaft to be smaller than a magnitude of the first magnetic force of the first radial magnetic bearing portion during non-rotation of the drive shaft.

23. The electric motor system of claim 22, wherein
the control unit is configured to set the magnitude of the first magnetic force of the first radial magnetic bearing portion to zero during rotation of the drive shaft.

24. The electric motor system of claim 15, wherein
the first radial magnetic bearing portion causes the first magnetic force to act on the drive shaft only by a permanent magnet.

25. The electric motor system of claim 15, wherein
the first radial magnetic bearing portion causes the first magnetic force to act on the drive shaft not based on any of the gap length of the first radial magnetic bearing portion, the gap length of the second radial magnetic bearing portion, and the gap length of the gap detection unit.

26. A turbo compressor including the electric motor system of claim 15, the turbo compressor further comprising:
an impeller provided on the drive shaft.

* * * * *